(12) United States Patent
Miyasaka

(10) Patent No.: US 9,790,333 B2
(45) Date of Patent: Oct. 17, 2017

(54) RUBBER COMPOSITION FABRICATION METHOD AND RUBBER COMPOSITION

(75) Inventor: Takashi Miyasaka, Osaka (JP)

(73) Assignee: TOYO TIRE & RUBBER CO., LTD., Osaka-Shi, Osaka (JP)

( * ) Notice: Subject to any disclaimer, the term of this patent is extended or adjusted under 35 U.S.C. 154(b) by 432 days.

(21) Appl. No.: 14/349,417

(22) PCT Filed: Jul. 13, 2012

(86) PCT No.: PCT/JP2012/067955
§ 371 (c)(1),
(2), (4) Date: Apr. 3, 2014

(87) PCT Pub. No.: WO2013/099331
PCT Pub. Date: Jul. 4, 2013

(65) Prior Publication Data
US 2014/0249250 A1 Sep. 4, 2014

(30) Foreign Application Priority Data
Dec. 28, 2011 (JP) .................. 2011-289273

(51) Int. Cl.
| | | |
|---|---|---|
| C08J 3/22 | (2006.01) | |
| B29B 7/18 | (2006.01) | |
| B29B 7/24 | (2006.01) | |
| B29B 7/28 | (2006.01) | |
| C08K 5/00 | (2006.01) | |
| C08K 13/02 | (2006.01) | |
| C08L 7/02 | (2006.01) | |
| C08J 3/24 | (2006.01) | |
| C08J 3/20 | (2006.01) | |

(52) U.S. Cl.
CPC .............. *C08J 3/22* (2013.01); *B29B 7/183* (2013.01); *B29B 7/246* (2013.01); *B29B 7/283* (2013.01); *B29B 7/286* (2013.01); *C08J 3/203* (2013.01); *C08J 3/24* (2013.01); *C08K 5/0016* (2013.01); *C08K 13/02* (2013.01); *C08L 7/02* (2013.01); *C08J 2307/02* (2013.01); *C08J 2321/00* (2013.01)

(58) Field of Classification Search
CPC ...................................... C08J 3/22; C08L 7/02
See application file for complete search history.

(56) References Cited

U.S. PATENT DOCUMENTS

| | | | |
|---|---|---|---|
| 4,818,113 | A | 4/1989 | Patel |
| 2009/0272692 | A1 | 11/2009 | Kurth et al. |
| 2010/0062156 | A1 | 3/2010 | Kurth et al. |
| 2010/0202950 | A1 | 8/2010 | Neverov et al. |
| 2011/0005997 | A1 | 1/2011 | Kurth et al. |
| 2011/0021664 | A1 | 1/2011 | Wang et al. |
| 2012/0261344 | A1 | 10/2012 | Kurth et al. |
| 2013/0018141 | A1 | 1/2013 | Oda et al. |
| 2014/0045989 | A1 | 2/2014 | Wang et al. |
| 2014/0050846 | A1 | 2/2014 | Kurth et al. |
| 2015/0247011 | A1* | 9/2015 | Nomura .................. B29B 13/06 524/526 |
| 2016/0114633 | A1* | 4/2016 | Miyasaka ................ B60C 1/00 152/542 |

FOREIGN PATENT DOCUMENTS

| | | |
|---|---|---|
| JP | 63-39305 A | 2/1988 |
| JP | 10-286824 A | 10/1998 |
| JP | 11-57445 A | 3/1999 |
| JP | 2000-280236 A | 10/2000 |
| JP | 2005-047094 A | 2/2005 |
| JP | 2010-065126 A | 3/2010 |
| JP | 2011-32424 A | 2/2011 |
| JP | 2011-68834 A | 4/2011 |
| JP | 2011-511148 A | 4/2011 |
| JP | 4909442 B1 | 4/2012 |

OTHER PUBLICATIONS

Machine Translation of JP 2000-280236 (2000).*
English Translation of JP 2000-280236.*
Office Action dated Sep. 8, 2015, issued in counterpart German Patent Application No. 112012005526.8, with English translation. (9 pages).
International Search Report, dated Aug. 28, 2012, issued in corresponding application No. PCT/JP2012/067955.
Notification of Transmittal of Translation of the International Preliminary Report on Patentability (form PCT/IB/338) dated Jul. 10, 2014, issues in International Application No. PCT/JP2012/067955, with form PCT/IB/373 and PCT/ISA/237 (7 pages).
Office Action dated Jul. 7, 2015, issued in counterpart Japanese Patent Application No. 2011-289273, with English translation (10 pages).
Chinese Office Action dated Dec. 2, 2014, issued in corresponding Chinese Patent Application No. 201280065260.6, w/English translation (13 pages).

* cited by examiner

Primary Examiner — Hannah Pak
(74) Attorney, Agent, or Firm — Westerman, Hattori, Daniels & Adrian, LLP

(57) ABSTRACT

A method for producing a rubber composition containing a rubber wet master batch has a masticating process. The masticating process comprises step 1 of charging the rubber wet master batch into an enclosed kneading chamber that has a stirring rotor showing a rotation speed controllable automatically through a control unit and that is capable of detecting and outputting an internal temperature, step 2 of setting a first control time and a first target temperature in the control unit, and step 3 of stirring the inside of the kneading chamber while making a PID control for adjusting an actually measured temperature in the kneading chamber to the first target temperature through the control unit on the basis of information on the actually measured temperature and the first target temperature, thereby automatically controlling the rotation speed, until the first control time elapses after the completion of the two steps.

2 Claims, 2 Drawing Sheets

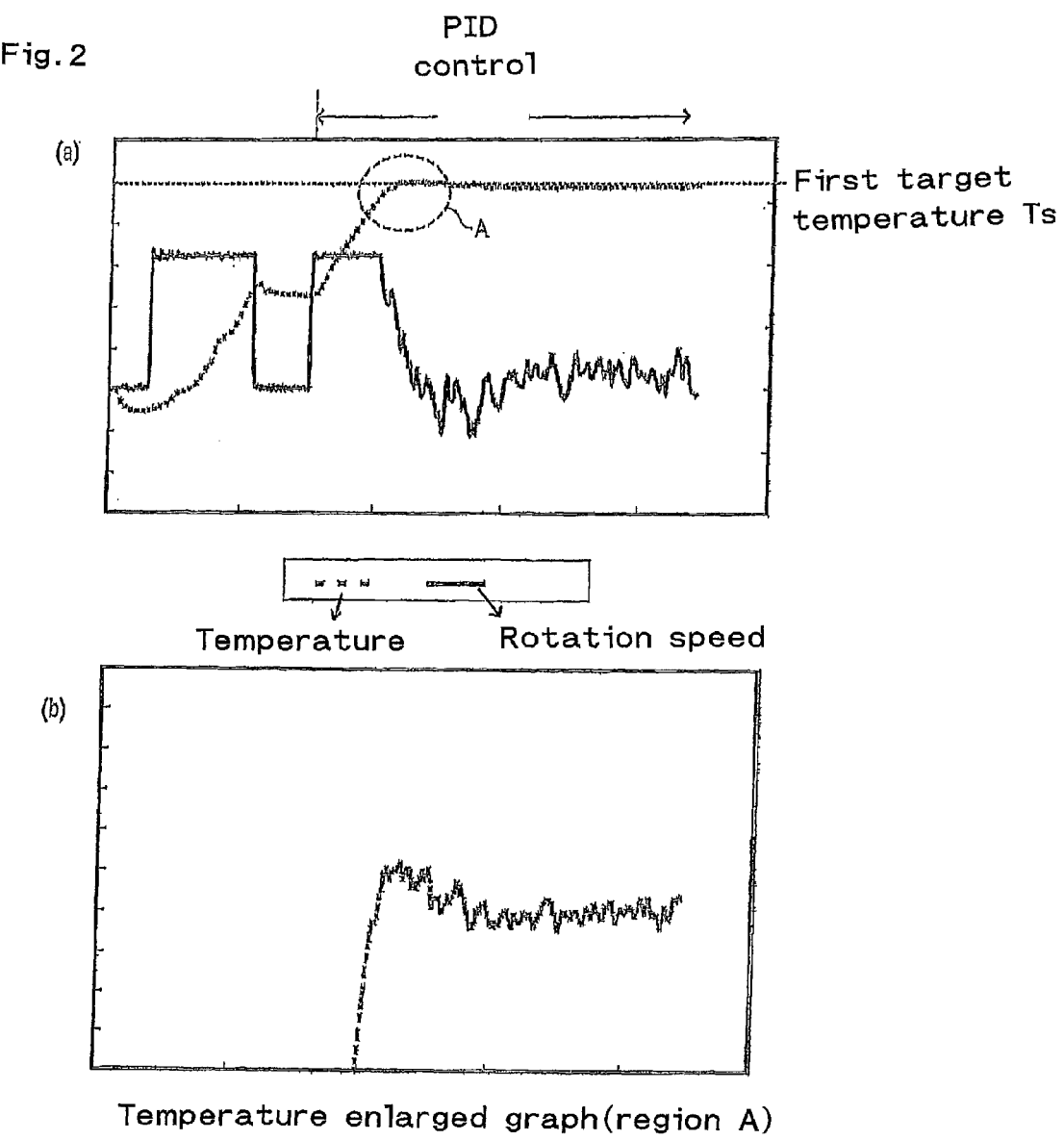

RUBBER COMPOSITION FABRICATION METHOD AND RUBBER COMPOSITION

TECHNICAL FIELD

The present invention relates to a method for producing a rubber composition containing a rubber wet master batch, and a rubber composition, and in particular to a method for producing a rubber composition that is excellent, particularly, in filler dispersibility therein, and is improved in rubber physical properties such as workability, reinforceability and low heat generation performance, and a rubber composition produced by this production method.

BACKGROUND ART

A rubber composition usable as a raw material of a rubber product is generally produced through the following three processes:

"Masticating Process"

A process of using a mixing/dispersing device to knead a rubber component singly, or a rubber component containing only a filler such as carbon black and not containing any other blending component. Through the masticating process, rubber molecular chains in the rubber component are cleaved and simultaneously the lengths of the molecular chains are made uniform. Additionally, the rubber component is decreased in elasticity to be heightened in plasticity. Thus, the rubber component is good in workability for subsequent rubber kneading.

"Kneading Process"

A process of charging stearic acid, zinc flower, an antiaging agent, and the like other than any vulcanization-related blending agent into the rubber component yielded after the masticating process; charging a filler further thereinto if no filler is blended in the masticating process; and then using a mixing/dispersing device to knead the resultant blend. In the kneading process, these blending agents are mixed with the rubber component, thereby producing, for example, the following advantageous effects: a rubber product after vulcanization is heightened in strength; the rubber is made good in workability for kneading; and the rubber is prevented from being deteriorated by radicals generated by the cleavage of molecular chains of the rubber.

"Vulcanization-Related Blending Agent Kneading Process"

Vulcanization-related blending agents, such as sulfur or any other vulcanizing agent, and a vulcanization promoter, are charged into the rubber composition yielded after the kneading process, and then the whole is kneaded. After the vulcanization-related blending agent kneading process, the resultant rubber composition is heated to a predetermined temperature or higher. In this case, the vulcanizing agent in the rubber composition reacts with molecules of the rubber so that a crosslinkage structure is formed between the rubber molecules. Thus, the molecules come to have a three-dimensional network structure to give rubber elasticity.

In general, these three processes are not continuously performed. In many cases, for example, the rubber component yielded after the masticating process is once discharged from the mixing/dispersing device, and again charged into another mixing/dispersing device, and subsequently the kneading process is performed. However, useless energy is consumed for kneading again the rubber discharged once after the masticating process and then cooled to a temperature near room temperature while the rubber is heated in the kneading process. Furthermore, when the rubber component in the state of being once cooled is kneaded while mechanical energy is given thereto, a decrease in the rubber viscosity by heating is not made sufficient. Thus, a high shearing force is given to at least a part of the rubber component. As a result, the polymer molecules are excessively cleaved to cause, for example, a problem of lowering a vulcanized rubber to be finally obtained in tensile stress and the like.

Patent Document 1 listed below describes a method for producing a rubber composition, in which a first kneader is used to masticate a master batch containing a rubber component and a filler, and then a second kneader is used to mix blending agents further with the masticated master batch. However, this production method cannot solve the above-mentioned problems.

Patent Document 2 listed below describes a method for producing a rubber composition, in which a rubber masticating process is contrived. However, this production method is equivalent to the prior art in blending agent-kneading process. Thus, this method cannot solve the above-mentioned problems, either.

PRIOR ART DOCUMENTS

Patent Documents

Patent Document 1: JP-A-2010-65126
Patent Document 2: JP-A-2011-511148

SUMMARY OF THE INVENTION

Problems to be Solved by the Invention

In light of the above-mentioned actual situation, the present invention has been made. An object thereof is to provide a rubber composition that is excellent in filler dispersibility therein, and is improved in low heat generation performance and restrained in thermal deterioration after the rubber is vulcanized; and a production method thereof.

Means for Solving the Problems

The object can be attained by the present invention as described hereinafter. That is, the present invention is a method for producing a rubber composition containing a rubber wet master batch, including: a masticating process of plasticizing/dispersing only the rubber wet master batch, and a kneading process of adding one or more blending agents other than any vulcanization-related blending agent to the rubber wet master batch yielded after the masticating process, wherein the masticating and kneading processes are performed by use of the same mixing/dispersing device, and the masticating process includes: step 1 of charging the rubber wet master batch into an enclosed kneading chamber that has a stirring rotor showing a rotation speed controllable automatically through a control unit and that is capable of detecting and outputting an internal temperature, step 2 of setting a first control time and a first target temperature in the control unit, and step 3 of stirring the inside of the kneading chamber while making a PID control for adjusting an actually measured temperature in the kneading chamber to the first target temperature through the control unit on the basis of information on the actually measured temperature and the first target temperature, thereby automatically controlling the rotation speed, until the first control time elapses after the completion of the two steps.

According to this production method, the masticating process and the kneading process are performed using the same mixing/dispersing device. In other words, after the masticating process, inside the same mixing/dispersing device, the rubber wet master batch is subjected to the kneading process without discharging the rubber wet master batch from the mixing/dispersing device. Accordingly, after the masticating process, the kneading process can be performed without lowering the temperature of the rubber component. For this reason, in the kneading process, molecules of the polymer in the rubber wet master batch can be prevented from being excessively cleaved, so that a vulcanized rubber to be finally obtained can maintain rubber physical properties such as tensile stress.

The rotation speed of the stirring rotor is automatically controlled by the PID control through the control unit, whereby the internal temperature of the kneading chamber can be kept within a constant range over a predetermined time. This manner makes it possible to masticate the rubber wet master batch inside the kneading chamber over a predetermined time while the temperature is maintained. Thus, the whole of the rubber component can be evenly kept at a predetermined temperature. As a result, it is possible to prevent reaction between the rubber molecules and generation of network chain (three-dimensional) bonds by local overheating of the rubber and the like. Consequently, a rubber composition usable as a raw material of a vulcanized rubber showing good rubber physical properties can be produced.

Furthermore, this production method makes it possible to keep the rubber wet master batch at a temperature lower than the first target temperature even when a cooling device is not necessarily used. Thus, a rubber composition showing good properties can be produced by an inexpensive system for which a large space is not required.

In this production method, it is preferred that the first target temperature in the masticating process is 180° C. or lower. This manner makes it possible to prevent deterioration of the rubber composition and further improve the composition in low heat generation performance.

In the production method, it is preferred that the kneading process includes: step 4 of charging the blending agent (s) other than any vulcanization-related blending agent into the kneading chamber in which the rubber wet master batch is present, step 5 of setting a second control time and a second target temperature in the control unit, and step 6 of stirring the inside of the kneading chamber while making a PID control for adjusting an actually measured temperature in the kneading chamber to the second target temperature through the control unit on the basis of information on the actually measured temperature and the second target temperature, thereby automatically controlling the rotation speed, until the second control time elapses after the completion of the two steps. In this manner, the PID control is made in the kneading process also, so that the rubber wet master batch can be masticated in the kneading chamber over a predetermined time while the temperature is maintained. Consequently, in the kneading process also, the blending agent(s) other than any vulcanization-related blending agent can be effectively dispersed into the rubber component while more effective prevention can be attained against reaction between the rubber molecules and generation of network chain (three-dimensional) bonds by local overheating of the rubber and the like.

As described above, the rubber composition according to the present invention is produced by any of the embodiments of the above-mentioned production method. Thus, the rubber composition is excellent in filler dispersibility therein, and is improved in low heat generation performance and restrained in thermal deterioration after the rubber is vulcanized.

BRIEF DESCRIPTION OF THE DRAWINGS

FIG. 2 are each a graph showing respective changes over time in an actually measured temperature in a kneading chamber and a rotation number of a motor under a PID control made through a control unit in the device.

MODE FOR CARRYING OUT THE INVENTION

Figure 1:
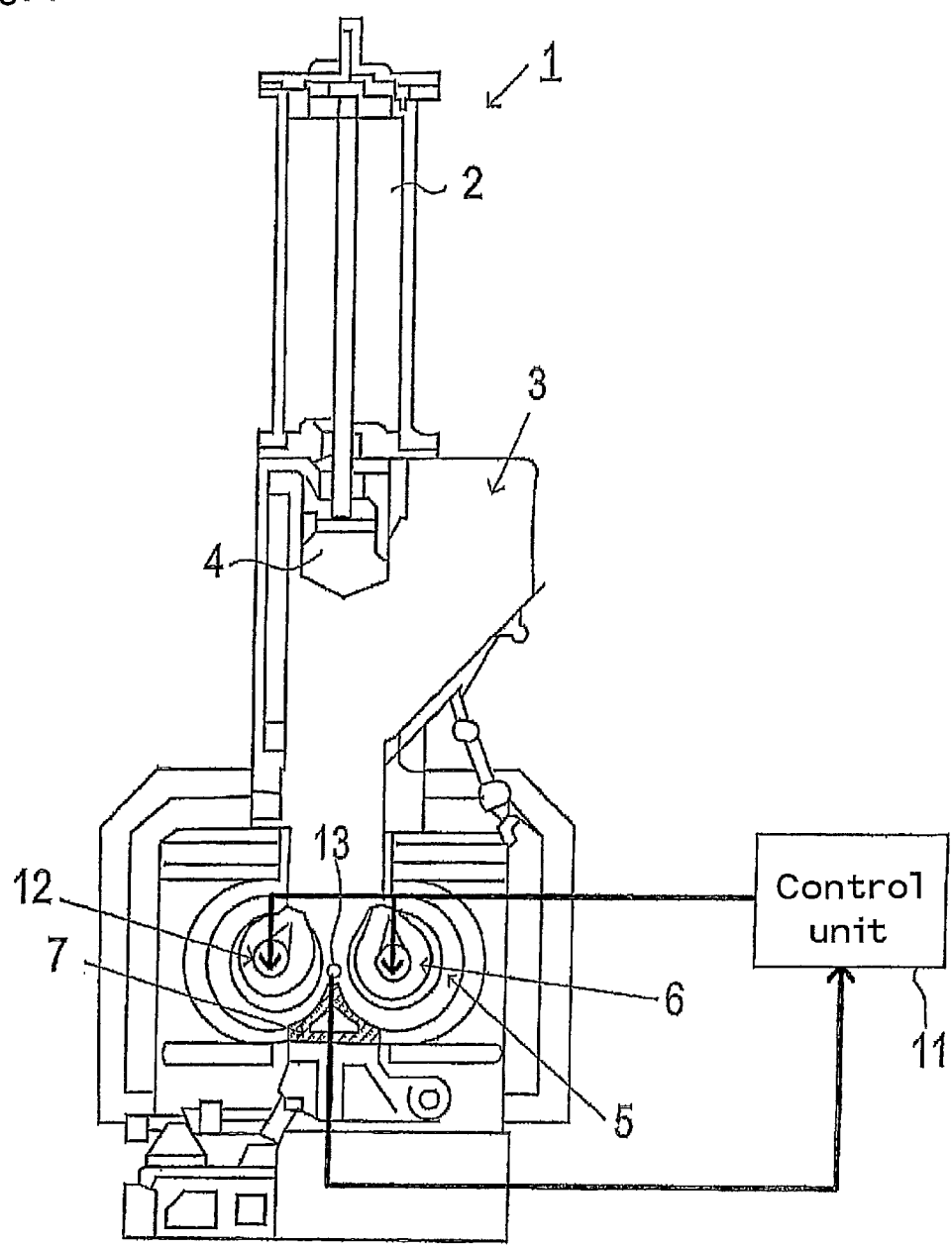
FIG. 1 is a schematic structural view of a kneading device related to the present invention.

In the method for producing a rubber composition according to the present invention, a masticating process and a kneading process are performed using the same mixing/dispersing device. This mixing/dispersing device may be, for example, an intermeshing Banbury mixer, a tangential Banbury mixer, or a kneader. In particular, an intermeshing Banbury mixer is preferred. Hereinafter, as the mixing/dispersing device, an intermeshing Banbury mixer will be given as an example, and a description thereabout will be made.

FIG. 1 illustrates a schematic view of an intermeshing Banbury mixer usable preferably in the present invention (hereinafter, the mixer may also be referred to as the device 1). The device 1 illustrated in FIG. 1 is a closed mixer, and is equipped with a cylinder 2 to be used to raise and lower a ram 4, a charging port 3 through which a working material is to be charged, a kneading chamber 5 for kneading the material, and a drop door 7 through which a kneaded rubber is to be discharged. The ram 4 is arranged to adjust the pressure in the kneading chamber 5 by the raising and lowering thereof.

The kneading chamber 5 has therein a pair of stirring rotors 6 for stirring the material. The stirring rotors 6 are driven to be rotated around a rotating axis 12 as a center through a motor (not illustrated). The kneading chamber 5 has a temperature sensor 13 for detecting the internal temperature of this chamber. This temperature sensor 13 may be set, for example, inside the drop door 7.

About the motor for rotating the stirring rotors 6, the rotation speed thereof is adjusted on the basis of a control signal from a control unit 1. The control unit 11 makes a control of the rotation speed of the motor on the basis of information on the temperature of the kneading chamber 5, the information being sent from the temperature sensor 13. It is sufficient for the structure of the motor to make the motor variable in rotation speed freely through the control unit 11. The motor is, for example, an inverter motor.

More specifically, about the rotation speed of the motor, in a PID calculating section located inside the control unit 11, a PID control is performed on the basis of making proportional (P), integral (I) and differential (D) operations, using a deviation between the actually measured temperature Tp in the kneading chamber 5, which is detected with the temperature sensor 13, and a target temperature Ts. In other words, the PID calculating section determines the rotation speed of the motor on the basis of the total value of respective control quantities obtained by a proportion (P) operation for calculating the control quantity in proportion to the difference (deviation "e") between the actually measured temperature Tp in the kneading chamber 5, which is detected with the temperature sensor 13, and the target temperature Ts, an integral (I) operation for calculating the control quantity in accordance with the integral value obtained by integrating the deviation "e" along the time axis direction, and a differential (D) operation for calculating the control quantity in accordance with the gradient of a change in the deviation "e", that is, the differential value.

In the rubber composition production method according to the present invention, the masticating process includes step 1 of charging a rubber wet master batch as described above into an enclosed kneading chamber that has a stirring rotor showing a rotation speed controllable automatically through a control unit and that is capable of detecting and outputting an internal temperature, step 2 of setting a first control time and a first target temperature in the control unit, and step 3 of stirring the inside of the kneading chamber while making a PID control for adjusting an actually measured temperature in the kneading chamber to the first target temperature through the control unit on the basis of information on the actually measured temperature and the first target temperature, thereby automatically controlling the rotation speed, until the first control time elapses after the completion of the two steps.

First, a rubber wet master batch is charged in the kneading chamber (step 1). Subsequently, on the basis of respective values of a first control time and a first target temperature inputted in step 2, the control unit 11 then starts a PID control (step 3). In other words, on the basis of a control signal from the control unit 11, the rotation speed of the motor is determined; accordingly, the rotation speed of the stirring rotors 6 (that is, the stirring speed) is determined. The information on the first control time and the first target temperature may be beforehand given to the control unit 11 at a stage in or before step 1.

The control unit 11 makes the PID control for the rotation speed of the motor over a time until the elapsed time "t" from the control starting time reaches the first control time or longer. As described above, a specific content of the control is as follows: the rotation speed is changed bit by bit on the basis of the deviation between the actually measured temperature Tp in the kneading chamber 5 and sent from the temperature sensor 13 and the first target temperature Ts, the integral value of the deviation, and the differential value of the deviation.

The value of the first target temperature is preferably 180° C. or lower, more preferably 165° C. or lower to result in the prevention of reaction between rubber molecules in the rubber component or the generation of network chain (three-dimensional) bonds to maintain stable rubber physical properties. The lower limit of the first target temperature is preferably, for example, 120° C. The first control time is preferably from 0.5 to 10 minutes, preferably from 1 to 5 minutes to allow the rubber to be evenly plasticized while a filler, such as carbon black, is more evenly dispersed. A given time is required until the actually measured temperature reaches a temperature near to the first target temperature after the PID control starts. The time until the PID control is terminated after the temperature reaches the temperature near to the first target temperature (first target temperature retention time) is preferably from 0.5 to 5 minutes, preferably from 1 to 3 minutes.

In the rubber composition production method according to the present invention, a PID control may be performed in the kneading process as well as in the masticating process. Specifically, the kneading process may have step 4 of charging one or more blending agents other than any vulcanization-related blending agent into the kneading chamber in which the rubber wet master batch is present, step 5 of setting a second control time and a second target temperature in the control unit, and step 6 of stirring the inside of the kneading chamber while making a PID control for adjusting an actually measured temperature in the kneading chamber to the second target temperature through the control unit on the basis of information on the actually measured temperature and the second target temperature, thereby automatically controlling the rotation speed, until the second control time elapses after the completion of the two steps. A method for this PID control, and the like, may be the same as that for the PID control in the masticating process.

The value of the second target temperature is preferably 180° C. or lower, more preferably 165° C. or lower to result in the prevention of reaction between rubber molecules in the rubber component or generation of network chain (three-dimensional) bonds to maintain stable rubber physical properties. The lower limit of the second target temperature is preferably, for example, 150° C. The second control time is preferably from 1 to 5 minutes, preferably from 2 to 4 minutes to allow the rubber to be evenly plasticized while the blending agent(s) other than any vulcanization-related blending agent are more evenly dispersed. A given time is required until the actually measured temperature reaches a temperature near to the second target temperature after the PID control starts. The time until the PID control is terminated after the temperature reaches the temperature near to the second target temperature (second target temperature retention time) is preferably from 0.5 to 5 minutes, preferably from 1 to 3 minutes.

FIG. 2 are each a graph showing respective changes over time in the actually measured temperature Tp in the kneading chamber 5, and the rotation number of the motor under the PID control made through the control unit 11 in the masticating process using the device 1. FIG. 2(b) is an enlarged view of a region A in FIG. 2(a).

According to FIG. 2, it is understood that by changing (raising or lowering) the rotation speed of the motor, the actually measured temperature Tp in the kneading chamber 5 can be maintained to be substantially equal to the first target temperature Ts over a long time. Thus, while the temperature is maintained, the rubber component can be masticated in the kneading chamber, so that the temperature of the whole of the rubber component can be evenly kept at a predetermined temperature. As a result, it is possible to prevent reaction between the rubber molecules and generation of network chain (three-dimensional) bonds by local overheating of the rubber and the like. Consequently, the rubber can be prevented from being deteriorated to produce a rubber composition usable as a raw material of a vulcanized rubber showing good rubber physical properties. In the example of FIG. 2, the PID control was conducted in the state that the first target temperature was set to 160° C. The actually measured temperature Tp succeeded in being maintained to be from 155 to 168° C.

After the kneading process is terminated, the rubber composition is discharged through the drop door 7. After the termination of the kneading process, another mixing/dispersing device may be used to perform a vulcanization-related blending agent kneading process. The mixing/dispersing device by which the masticating process and the kneading process are performed may be used to perform a vulcanization-related blending agent kneading process.

The following will describe individual components usable as raw materials of the rubber composition according to the present invention.

In the rubber composition production method according to the present invention, a rubber wet master batch is masticated in the masticating process. In order to use a rubber wet master batch in which a filler is evenly dispersed and the re-flocculation of the filler is restrained over time, this rubber wet master batch to be used is preferably produced by a production method including process (I) of using, as raw materials, at least a filler, a dispersing solvent and a rubber latex solution, and adding, when the filler is dispersed into the dispersing solvent, at least one portion of the rubber latex solution thereto, thereby producing a slurry solution containing the filler to which rubber latex particles adhere; process (II) of mixing the slurry solution and the remaining rubber latex solution with each other to produce a rubber latex solution containing the filler to which rubber latex particles adhere; and process (III) of solidifying and drying the rubber latex solution containing the filler to which rubber latex particles adhere.

The filler denotes an inorganic filler used ordinarily in the rubber industry, such as carbon black, silica, clay, talk, calcium carbonate, magnesium carbonate, or aluminum hydroxide. Of these inorganic fillers, carbon black is in particular preferably usable.

The carbon black can be any carbon black usable in any ordinary rubber industry, such as SAF, ISAF, HAF, FEF or GPF, or can be any conductive carbon black such as acetylene black or Ketjenblack. The carbon black may be granulated carbon black, which is made into grains, considering the handleability thereof, or non-granulated carbon black.

The dispersing solvent is in particular preferably water, and may be, for example, water containing an organic solvent.

The rubber latex solution may be a natural rubber latex solution, or a synthetic rubber latex solution.

The natural rubber latex solution is a natural product by a metabolism effect of a plant, and is in particular preferably a natural rubber/water system solution, in which a dispersing solvent therein is water. For its natural rubber latex, a concentrated latex, and a fresh latex called a field latex are usable without any discrimination. The number-average molecular weight of a natural rubber in the natural rubber latex is preferably 2,000,000, more preferably 2,500,000. The synthetic rubber latex solution is a solution produced by emulsion-polymerizing, for example, a styrene-butadiene rubber, a butadiene rubber, a nitrile rubber, or a chloroprene rubber.

(1) Process (I)

Process (I) is a process of adding, when carbon black is dispersed into a dispersing solvent, at least one portion of a natural rubber latex solution thereto, thereby producing a slurry solution containing carbon black to which natural rubber latex particles adhere. It is allowable to mix the natural rubber latex solution beforehand with the dispersing solvent, and subsequently add carbon black thereto so as to be dispersed. It is also allowable to add carbon black into the dispersing solvent, and next disperse carbon black into the dispersing solvent while the natural rubber latex solution is added thereto at a predetermined addition speed, or to add carbon black into the dispersing solvent, and next disperse carbon black into the dispersing solvent while fractions divided from the natural rubber latex solution and each having a given volume are added thereto through plural separated operations. By dispersing carbon black into the dispersing solvent in the state that the natural rubber latex solution is present therein, a slurry solution can be produced which contains carbon black to which natural rubber latex particles adhere. In process (I), the addition proportion of the natural rubber latex solution is, for example, from 0.075 to 12% by mass of the whole of a natural rubber latex solution to be used (the whole of solution fractions to be added in processes (I) and (II)).

In process (I), the solid (rubber) content in the natural rubber latex solution to be added is preferably from 0.25 to 15% by mass of carbon black, preferably from 0.5 to 6% thereof. The solid (rubber) concentration in the natural rubber latex solution to be added is preferably from 0.2 to 5% by mass, more preferably from 0.25 to 1.5% by mass. In these cases, a rubber wet master batch can be produced which is improved in carbon black dispersibility therein while natural rubber latex particles are certainly allowed to adhere to carbon black.

In process (I), the method for mixing carbon black and the dispersing solvent with each other in the presence of the natural rubber latex solution may be a method of using a common disperser, such as a high-shearing mixer, a High Shear Mixer, a homo-mixer, a ball mill, a bead mill, a high-pressure homogenizer, an ultrasonic homogenizer, or a colloid mill, to disperse carbon black.

The "high-shearing mixer" denotes a mixer having a rotor rotatable at a high velocity and a fixed stator, in which the rotor is rotated in the state that a precise clearance is set between the rotor and the stator, whereby a high-shearing effect acts. In order to generate such a high-shearing effect, it is preferred to set the clearance between the rotor and the stator, and the peripheral, velocity of the rotor to 0.8 mm or less, and 5 m/s or more, respectively. Such a high-shearing mixer can be a commercially available product. An example thereof is a product "High Shear Mixer" manufactured by Silverson.

In the case of mixing carbon black and the dispersing solvent with each other in the presence of the natural rubber latex solution to produce the slurry solution containing carbon black to which the natural rubber latex particles adhere, a surfactant may be added thereto to improve carbon black in dispersibility. The surfactant may be a surfactant known in the rubber industry. Examples thereof include nonionic surfactants, anionic surfactants, cationic surfactants, and amphoteric surfactants. Instead of the surfactant or in addition to the surfactant, an alcohol such as ethanol may be used. However, it is feared that the use of the surfactant makes rubber physical properties of a finally obtained vulcanized rubber low. Thus, the amount of the surfactant blended is preferably 2 parts or less by mass, more preferably 1 part or less by mass based on 100 parts by mass of the solid (rubber) content in the natural rubber latex solution. It is preferred not to use any surfactant substantially.

About carbon black to which the natural rubber latex particles adhere in the slurry solution produced in process (I), the 90% volume particle size (μm) ("D90") is preferably 31 μm or more, more preferably 35 μm or more. In this case, carbon black in the slurry solution is excellent in dispersibility, and can be prevented from re-flocculating. Thus, the slurry solution is excellent in storage stability, and further the finally obtained vulcanized rubber is also excellent in heat generation property, durability and rubber strength. In the present invention, the D90 of carbon black to which the natural rubber latex particles adhere means a value obtained by making measurement about carbon black and the adhering natural rubber latex particles.

(2) Process (II)

Process (II) is a process of mixing the slurry solution and the remaining rubber latex solution with each other to produce a rubber latex solution containing the carbon black to which the natural rubber latex particles adhere. The method for mixing the slurry solution and the remaining rubber latex solution with each other in a liquid phase is not particularly limited, and may be a method of using an ordinary disperser, such as a high-shearing mixer, a High Shear Mixer, a homo-mixer, a ball mill, a bead mill, a high-pressure homogenizer, an ultrasonic homogenizer, or a colloid mill, to mix them. At the time of the mixing, the whole of the mixing system, such as the disperser, may be optionally warmed.

When the drying time and labors in/for next process (III) are considered, the remaining rubber latex solution is preferably made higher in solid (rubber) concentration than the natural rubber latex solution added in process (I). Specifically, the solid (rubber) concentration is preferably from 10 to 60% by mass, more preferably from 20 to 30% by mass.

(3) Process (III)

Process (III) is a process of solidifying and drying the rubber latex solution containing the carbon black to which the natural rubber latex particles adhere. The method for the solidifying and drying may be a solidifying and drying method of incorporating a solidifier into the rubber latex solution containing the carbon black to which the natural rubber latex particles adhere, to solidity the solution, and subsequently drying the solidified product, or an exsiccating method of drying the solution without solidifying the solution.

The solidifier used in the solidifying and drying method may be an acid or salt usable usually for solidifying a rubber latex solution, such as formic acid, sulfuric acid, or sodium chloride.

The method for drying the natural rubber latex solution containing the carbon black may be a method using a drying apparatus that may be of various types, such as a screw press machine, an oven, a vacuum drier, or an air drier.

In the present invention, it is allowable to incorporate a flocculant into the rubber latex solution containing the carbon black to which the natural rubber latex particles adhere, this solution being obtained by mixing the slurry solution containing the carbon black to which the natural rubber latex particles adhere, with the natural rubber latex solution in the liquid phase, and subsequently collect the resultant flocculation product and then dry the product. As the flocculant, a substance known as a flocculant for rubber latex solution may be used without any restriction. Specific examples thereof include cationic flocculants.

The rubber wet master batch yielded after process (III) preferably contains 40 to 80 parts by mass of the filler based on 100 parts by mass of the rubber. In this case, a rubber wet master batch can be produced which is improved, with a good balance, in filler dispersibility therein and in heat generation property and durability of a vulcanized rubber to be obtained when the master batch is vulcanized.

In the natural rubber wet master batch yielded after process (III), the carbon black contained is evenly dispersed, and is further excellent in dispersion stability over time.

In the rubber composition production method according to the present invention, one or more blending agents other than any vulcanization-related blending agent are mixed in the kneading process. Examples of the blending agent(s) other than the vulcanization-related blending agent include an anti-aging agent, zinc oxide, a softening agent such as stearic acid, wax or oil, a processing aid, an organic acid metal salt, a methylene acceptor and a methylene donor, and an additional rubber.

Examples of the organic acid metal salt include cobalt naphthenate, cobalt stearate, cobalt borate, cobalt oleate, cobalt maleate, and cobalt borate trineodecanoate.

The methylene acceptor may be a phenolic compound, or a phenolic resin, in which a phenolic compound is condensed with formaldehyde. Examples of the phenolic compound include phenol and resorcin, and alkyl derivatives thereof. Examples of such alkyl derivatives include methyl derivatives of cresol or xylenol; and long-chain-alkyl derivatives, such as nonylphenol and octylphenol. The phenolic compound may be a phenolic compound having, as its substituent, an acyl group such as an acetyl group.

Examples of the phenolic resin, in which a phenolic compound is condensed with formaldehyde, include resorcin-formaldehyde resins, phenolic resins (phenol-formaldehyde resin), cresol resins (cresol-formaldehyde resin), and formaldehyde resins made from plural phenolic compounds. These are each used in the form of an uncured resin having fluidity or thermal fluidity.

Of these methylene receptors, resorcin or a resorcin derivative is preferred from the viewpoint of the compatibility thereof with the rubber component or other components, the denseness of a resin obtained after the curing thereof, and the reliability. Particularly preferred is resorcin or a resorcin-alkylphenol-formalin resin.

The methylene donor may be hexamethylenetetramine or a melamine resin. Examples of the melamine resin include methylolmelamine, a partially etherized product of methylolmelamine, and condensates made from melamine, formaldehyde, and methanol. Of these methylene donors, particularly preferred is hexamethoxymethylmelamine.

Examples of the additional rubber include natural rubber (NR), polyisoprene rubber (IR), styrene butadiene rubber (SBR), polybutadiene rubber (BR), butadiene rubber containing syndiotactic 1,2-polybutadiene (SPB), chloroprene rubber (CR), and nitrile rubber (NBR). These may be used alone, or in the form of a blend of two or more thereof. These examples of the diene rubbers may each be optionally used in the form of a rubber in which one or more terminals are modified (such as terminal-modified BR or terminal-modified SBR), or in the form of a rubber in which modification is attained to afford a desired property (such as modified NR). The polybutadiene rubber (BR) may be one synthesized using a cobalt (Co) catalyst, a neodymium (Nd) catalyst, a nickel (Ni) catalyst, a titanium (Ti) catalyst or a lithium (Li) catalyst; or one synthesized using a polymerization catalyst composition containing a metallocene complex described in WO 2007-129670.

The anti-aging agent may be any anti-aging agent usable ordinarily for rubbers. Examples thereof include aromatic amine type anti-aging agents, amine-ketone type anti-aging agents, monophenol type anti-aging agents, bisphenol type anti-aging agents, polyphenol type anti-aging agents, dithiocarbamic acid salt type anti-aging agents, and thiourea type anti-aging agents. These may be used alone or in the form of an appropriate mixture. The content of the anti-aging agent is more preferably from 1 to 5 parts by mass, even more preferably from 2 to 4.5 parts by mass based on 100 parts by mass of the rubber component.

Examples of a vulcanization-related blending agent used in the vulcanization-related blending agent kneading process include vulcanizing agents such as sulfur and organic peroxides, vulcanization promoters, vulcanization promoting aids, and vulcanization retarders.

It is sufficient for the sulfur vulcanizing agents that sulfur therein is sulfur for ordinary rubbers. Examples thereof include powdery sulfur, precipitated sulfur, insoluble sulfur, and high dispersing sulfur.

The vulcanization promoters may each be a vulcanization promoter usable usually for rubber vulcanization. Examples thereof include sulfenamide type vulcanization promoters, thiuram type vulcanization promoters, thiazole type vulcanization promoters, thiourea type vulcanization promoters, guanidine type vulcanization promoters, and dithiocarbamic acid salt type vulcanization promoters. These may be used alone or in the form of an appropriate mixture.

EXAMPLES

Hereinafter, the present invention will be more specifically described by demonstrating examples thereof. Raw materials and devices used therein are as follows:
(Used Materials)
a) Fillers:
    Carbon black "N326": "SEAST 300" (manufactured by Tokai Carbon Co., Ltd.)
    Carbon black "N110": "SEAST 9" (manufactured by Tokai Carbon Co., Ltd.)
    Carbon black "N550": "SEAST SO" (manufactured by Tokai Carbon Co., Ltd.)
b) Dispersing solvent: water
c) Rubber latex solutions:
    Natural rubber concentrated latex solution, manufactured by Regitex Co., Ltd. (DRC (dry rubber content)=60%)
    Natural rubber fresh latex solution (NR field latex), manufactured by Golden Hope (DRC=31.2%)
d) Solidifier: formic acid (obtained by diluting a first-class 85% solution thereof into a 10% solution, and adjusted into a pH of 1.2), manufactured by Nacalai Tesque, Inc.
e) Zinc flower:
    "No. 1 zinc flower", manufactured by Mitsui Mining & Smelting Co., Ltd.
    "No. 3 zinc flower", manufactured by Mitsui Mining & Smelting Co., Ltd.
f) Stearic acid, manufactured by NOF Corp.
g) Wax, manufactured by Nippon Seiro Co., Ltd.
h) Anti-aging agent:
    N-phenyl-N'-(1,3-dimethylbutyl)-p-phenylenediamine "6PPD", manufactured by Monsanto Japan Limited
i) Sulfur:
    Sulfur, manufactured by Tsurumi Chemical Industry Co., Ltd.
    Insoluble sulfur: "OT-20", manufactured by Akzo Nobel
j) Vulcanization promoters:
    "CBS", manufactured by Sanshin Chemical Industry Co., Ltd.
    N,N-dicyclohexylbenzothiazole-2-sulfenamide, "NOCCELER DZ", manufactured by Ouchi Shinko Chemical Industry Co., Ltd.
k) Boron-containing organic acid cobalt salt: "MANOBONDU C680C", manufactured by OMG Inc.
l) Resorcin-alkylphenol-formalin resin: "SUMIKANOL 620", manufactured by Sumitomo Chemical Co., Ltd.
m) Hexamethoxymethylmelamine: "CYLETS 963L", manufactured by Mitsui Cytex, Ltd.
n) Additional rubber: High-cis polybutadiene rubber, "BR150L", manufactured by Ube Industries, Ltd.
(Rubber Wet Master Batch Production Example)
    A rubber wet master batch was produced by the following method:
    Carbon black was added into a diluted latex solution in water, the concentration being adjusted to 0.5% by mass, so as to give a carbon black concentration of 5% by mass. A device, ROBOMIX, manufactured by Primix Corp., was used to disperse the carbon black therein (ROBOMIX conditions: rotation at 9000 rpm for 30 minutes) to produce a slurry solution containing the carbon black to which natural rubber latex particles adhered (process (I)).
    To the slurry solution containing the carbon black to which natural rubber latex particles adhered was added the remaining natural rubber latex solution (the solid (rubber) concentration therein was adjusted to 25% by mass by the addition of water) to adjust the total of the solid (rubber) content therein and that in the natural rubber latex solution used in process(I) to 100 parts by mass. Next, a mixer for household use, model SM-L56, manufactured by Sanyo Electric Co., Ltd., was used to mix these components with each other (mixer conditions: rotation at 11300 rpm for 30 minutes) to produce a carbon black-containing natural rubber latex solution (process(II)).
    A 10%-by-mass solution of formic acid in water as a solidifier was added to the carbon black-containing natural rubber latex solution produced in process(II) until the pH of the whole reached 4. A screen (φ2 punching, manufactured by Toyo Screen Kogyo Co., Ltd.) was used to remove water from the solution containing the carbon black-containing natural rubber solidified product to adjust the water content therein to 50% or less.
    The anti-aging agent 6PPD was added to the carbon black-containing natural rubber latex solution containing the solidified product, in which the water content had been adjusted to 50% or less, to give a concentration of 1% by mass. The resultant was charged into a screw press machine (article number: V-02, manufactured by Suehiro EPM Corp.; barrel diameter: 90 mm; "barrel length"/"barrel diameter" (L/D)=8.6; and slit widths between the barrel and the screw: 0.7 mm. 0.5 mm, and 0.2 mm), and then dried, finally giving a carbon black-containing natural rubber wet master batch having a water content of 1.2%. When such a master batch is further dried, a drying apparatus may be used, or the master batch may be air-dried. The drying apparatus may be a vacuum drier, an air drier, a vibrating drying machine, or any other drying machine which does not apply mechanical energy.
(Rubber Composition Production Examples)
    At the time of producing any rubber composition, in a masticating process and a kneading process therefor, the same mixing/dispersing device (the B type Banbury mixer (manufactured by Kobe Steel, Ltd.) illustrated in FIG. 1) was used.

Example 1

(1) Masticating Process

In Table 1 is shown the carbon black-containing natural rubber wet master batch (the carbon black and natural rubber latex species used, parts by mass of the carbon black based on 100 parts by weight of the natural rubber (solid therein), and the Moony viscosity (ML1+4.0) of the rubber wet master batch, which was measured according to JIS K6300 (measuring temperature: 100° C.)). In Table 1, "WMB" denotes "carbon black-containing natural rubber wet master batch"; and "CB" denotes "carbon black". The rubber wet master batch was charged into the kneading chamber of the Banbury mixer (step 1), and the first control time and the first target temperature were set to 2 minutes and 160° C., respectively (step 2). Next, a masticating process therefor was performed while a PID control was made (step 3).

(2) Kneading Process

After the masticating process was performed, 1 part by mass of stearic acid, 3 parts by mass of No. 1 zinc flower, and 1 part by mass of the wax were charged into the kneading chamber in which the carbon black-containing natural rubber wet master batch was present (step 4). The second control time and the second target temperature were set to 2 minutes and 165° C., respectively (step 5). Next, a kneading process therefor was performed while a PID control was made (step 6). After the termination of the kneading process, the rubber composition was discharged through the drop door.

(3) Vulcanization-Related Blending Agent Kneading Process

The B type Banbury mixer (manufactured by Kobe Steel, Ltd.) was used to charge vulcanization-related blending agents (2 parts by mass of the sulfur manufactured by Tsurumi Chemical Industry Co., Ltd., and 1 part by mass of the vulcanization promoter CBS), and then a kneading process therefor was performed to produce a rubber composition according to Example 1.

Example 2

A rubber composition was produced in the same way as in Example 1 except that the natural rubber latex species as a raw material was changed into a species shown in Table 1.

Example 3

A rubber composition was produced in the same way as in Example 1 except that in the kneading process, the blending agents to be added were changed to 2 parts by mass of the anti-aging agent, 8 parts by mass of No. 3 zinc flower, 0.8 part by mass of the boron-containing organic acid cobalt salt, 2 parts by mass of the resorcin-alkylphenol-formalin resin, and 4 parts by mass of hexamethoxymethylmelamine, and in the vulcanization-related blending agent kneading process, the vulcanization-related blending agents were changed to 4.5 parts by mass of the insoluble sulfur and 1 part by mass of the vulcanization promoter DZ.

Example 4

A rubber composition was produced in the same way as in Example 1 except that in the kneading process, the blending agents to be added were changed to 20 parts by mass of the additional rubber (high-cis polybutadiene rubber), 2 parts by mass of stearic acid, 1 part by mass of the anti-aging agent, 3 parts by mass of No. 1 zinc flower, and 1 part by mass of the wax, and in the vulcanization-related blending agent kneading process, the vulcanization-related blending agents were changed to 2 parts by mass of the sulfur manufactured by Tsurumi Chemical Industry Co., Ltd. and 1 part by mass of the vulcanization promoter CBS.

Comparative Example 1

A rubber composition was produced in the same way as in Example 1 except that the carbon black-containing natural rubber wet master batch was charged into the kneading chamber of the Banbury mixer; a masticating process therefor was performed without making any PID control; when the actually measured temperature reached 160° C., the master batch was discharged; and after the discharging, and the following kneading process was performed: the masticated carbon black-containing natural rubber wet master batch was charged into the kneading chamber of the Banbury mixer at the same time of charging thereinto 1 part by mass of stearic acid, 3 parts by mass of No. 3 zinc flower, and 1 part by mass of the wax; and when the actually measured temperature reached 162° C., the rubber composition was discharged through the drop door.

Comparative Example 2

A rubber composition was produced in the same way as in Example 1 except that the carbon black-containing natural rubber wet master batch was charged into a kneading chamber of a biaxial extruder ("KTX-37", manufactured by Kobe Steel, Ltd.; barrel diameter: 37 mm; and "barrel length"/"barrel diameter" (L/D)=30); a masticating process therefor was performed (masticating temperature: 155° C.) without making any PID control; the master batch was discharged; and after the discharging, and the following kneading process was performed: the masticated carbon black-containing natural rubber wet master batch was charged into the kneading chamber of the Banbury mixer at the same time of charging thereinto 1 part by mass of stearic acid, 3 parts by mass of No. 1 zinc flower, and 1 part by mass of the wax; and when the actually measured temperature reached 160° C., the rubber composition was discharged through the drop door.

Comparative Example 3

A rubber composition was produced in the same way as in Example 1 except that the carbon black-containing natural rubber wet master batch was charged into a kneading chamber of a kneader ("Model WDS7-30", manufactured by Moriyama Co., Ltd.); a masticating process therefor was performed (masticating temperature: 150° C.) without making any PID control; the master batch was discharged; and after the discharging, and the following kneading process was performed: the masticated carbon black-containing natural rubber wet master batch was charged into the kneading chamber of the Banbury mixer at the same time of charging thereinto 1 part by mass of stearic acid, 3 parts by mass of No. 1 zinc flower, and 1 part by mass of the wax; and when the actually measured temperature reached 157° C., the rubber composition was discharged through the drop door.

Comparative Example 4

A rubber composition was produced in the same way as in Example 1 except that no masticating process was performed, and the following was performed in the kneading process: the carbon black-containing natural rubber wet master batch was charged into the kneading chamber of the Banbury mixer at the same time of charging thereinto 1 part by mass of stearic acid, 3 parts by mass of No. 1 zinc flower, and 1 part by mass of the wax; and when the actually measured temperature reached 159° C., the rubber composition was discharged through the drop door.

Comparative Example 5

A rubber composition was produced in the same way as in Example 1 except that the carbon black-containing natural rubber wet master batch was charged into the kneading chamber of the Banbury mixer; a masticating process therefor was performed without making any PID control; when the actually measured temperature reached 160° C., the master batch was discharged; and after the discharging, and the following kneading process was performed: the masticated carbon black-containing natural rubber wet master batch was charged into the kneading chamber of the Banbury mixer at the same time of charging thereinto 2 parts by mass of the anti-aging agent, 8 parts by mass of No. 3 zinc flower, 0.8 parts by mass of the boron-containing organic acid cobalt salt, 2 parts by mass of the resorcin-alkylphenol-formalin resin, and 4 parts by mass of hexamethoxymethylmelamine; and when the actually measured temperature reached 160° C., the rubber composition was discharged through the drop door.

Comparative Example 6

A rubber composition was produced in the same way as in Example 1 except that the carbon black-containing natural rubber wet master batch was charged into the kneading chamber of the Banbury mixer; a masticating process therefor was performed without making any PID control; when the actually measured temperature reached 161° C., the master batch was discharged; and after the discharging, and the following kneading process was performed: the masticated carbon black-containing natural rubber wet master batch was charged into the kneading chamber of the Banbury mixer at the same time of charging thereinto 20 parts by mass of the additional rubber (high-cis polybutadiene rubber), 2 parts by mass of stearic acid, 1 part by mass of the anti-aging agent, 3 parts by mass of No. 1 zinc flower, and 1 part by mass of the wax; and when the actually measured temperature reached 160° C., the rubber composition was discharged through the drop door.

(Evaluation)

Evaluation was made about a rubber obtained by using a predetermined mold to heat and vulcanize each of the rubber compositions at 150° C. for 30 minutes.

(Rubber Strength of Vulcanized Rubber (300% Modulus))

A JIS No. 3 dumbbell was used to produce a sample. The 300% modulus of the sample was measured according to JIS-K 6251. For the evaluation thereof, about each of Examples 1 to 2, and Comparative Examples 2 to 4, the measured value of the 300% modulus of Comparative Example 1 was regarded as 100, and the value of the example was represented as an index relative thereto. About Example 3, the measured value of the 300% modulus of Comparative Example 5 was regarded as 100, and the value of this example was represented as an index relative thereto. About Example 4, the measured value of the 300% modulus of Comparative Example 6 was regarded as 100, and the value of this example was represented as an index relative thereto. As the numerical value of the sample is higher, its rubber is further prevented from being deteriorated at the time of the production of the rubber composition, so that this sample is better in rubber physical properties.

(Vulcanized Rubber Low Heat Generation Performance)

The heat generation property of each of the produced vulcanized rubbers was evaluated on the basis of the tangent loss tan δ thereof in accordance with JIS K6265. The tan δ was measured, using a rheospectrometer E4000 manufactured by UBM Japan Co., Ltd. at 50 Hz, 80° C. and a dynamic strain of 2'. The measured value was converted into an index. For the evaluation, about each of Examples 1 to 2, and Comparative Examples 2 to 4, the measured value of the tan δ of Comparative Example 1 was regarded as 100, and the value of the example was represented as an index relative thereto. About Example 3, the measured value of the tan δ of Comparative Example 5 was regarded as 100, and the value of this example was represented as an index relative thereto. About Example 4, the measured value of the tan δ of Comparative Example 6 was regarded as 100, and the value of this example was represented as an index relative thereto. As the numerical value of the rubber is smaller, the rubber is lower in heat generation property to be better.

TABLE 1

| | Comparative Example 1 | Comparative Example 2 | Comparative Example 3 | Comparative Example 4 | Example 1 | Example 2 | Comparative Example 5 | Example 3 | Comparative Example 6 | Example 4 |
|---|---|---|---|---|---|---|---|---|---|---|
| CB species of WMB/parts by mass | N550/70 | N550/70 | N550/70 | N550/70 | N550/70 | N550/70 | N326/60 | N326/60 | N110/50 | N110/50 |
| Latex species of WMB | Fresh | Fresh | Fresh | Fresh | Fresh | Concentrated | Fresh | Fresh | Fresh | Fresh |
| WMB viscosity (ML1 + 4.0) | 185 | 185 | 185 | 185 | 185 | 181 | 179 | 179 | 179 | 179 |
| Masticating process | | | | | | | | | | |
| Mixing/dispersing device used | Banbury mixer | Biaxial extruder | Kneader | Masticating process, not performed | Banbury mixer | Banbury mixer | Banbury mixer | Banbury mixer | Banbury mixer | Banbury mixer |
| PID control | Not made | Not made | Not made | — | Made | Made | Not made | Made | Not made | Made |
| First target temperature | — | — | — | — | 160° C. | 160° C. | — | 160° C. | — | 160° C. |
| First control time | — | — | — | — | 2 minutes | 2 minutes | — | 2 minutes | — | 2 minutes |
| Discharge temperature | 160° C. | 155° C. | 150° C. | — | — | — | 161° C. | — | 161° C. | — |
| WMB discharge after masticating process | Done | Done | Done | — | Not done | Not done | Done | Not done | Done | Not done |
| Kneading process | | | | | | | | | | |
| Mixing/dispersing device used | Banbury mixer | Banbury mixer | Banbury mixer | Banbury mixer | Banbury mixer | Banbury mixer | Banbury mixer | Banbury mixer | Banbury mixer | Banbury mixer |
| PID control | Not made | Not made | Not made | Not made | Made | Made | Not made | Made | Not made | Made |
| Second target temperature | — | — | — | — | 165° C. | 165° C. | — | 165° C. | — | 165° C. |

TABLE 1-continued

|  | Comparative Example 1 | Comparative Example 2 | Comparative Example 3 | Comparative Example 4 | Example 1 | Example 2 | Comparative Example 5 | Example 3 | Comparative Example 6 | Example 4 |
|---|---|---|---|---|---|---|---|---|---|---|
| Second control time | — | — | — | — | 2 minutes | 2 minutes | — | 2 minutes | — | 2 minutes |
| Discharge temperature | 162° C. | 160° C. | 157° C. | 159° C. | 161° C. | 162° C. | 160° C. | 161° C. | 160° C. | 161° C. |
| Rubber properties | | | | | | | | | | |
| 300% modulus (INDEX) | 100 | 101 | 104 | 107 | 125 | 123 | 100 | 127 | 100 | 127 |
| Low heat generation performance (tanδ) | 100 | 103 | 105 | 107 | 84 | 85 | 100 | 83 | 100 | 83 |

From the results in Table 1, it is found that the vulcanized rubber of the rubber composition yielded by the production method according to each of Examples 1 to 4 is excellent in rubber strength and excellent in rubber physical properties, and is also excellent in low heat generation performance.

The invention claimed is:

1. A method for producing a rubber composition containing a rubber wet master batch, comprising:
   a masticating process of plasticizing/dispersing only the rubber wet master batch, and a kneading process of adding one or more blending agents other than any vulcanization-related blending agent to the rubber wet master batch yielded after the masticating process, wherein the masticating and kneading processes are performed by use of the same mixing/dispersing device, and
   the masticating process comprises:
   step 1 of charging the rubber wet master batch into an enclosed kneading chamber that has a stirring rotor showing a rotation speed controllable automatically through a control unit and that is capable of detecting and outputting an internal temperature, step 2 of setting a first control time and a first target temperature in the control unit, and
   step 3 of stirring the rubber wet master batch inside the kneading chamber while making a PID control for adjusting a first actually measured temperature in the kneading chamber to the first target temperature through the control unit on the basis of information on the first actually measured temperature and the first target temperature, thereby automatically controlling the rotation speed, until the first control time elapses after the completion of the steps 1 and 2,
   wherein the first actually measured temperature in the kneading chamber is an internal temperature of the kneading chamber detected by a temperature sensor and sent to the control unit during the masticating process, and the first target temperature in the masticating process is 160° C. or more and 180° C. or lower, and the first control time is 0.5 to 10 minutes.

2. The method for producing a rubber composition according to claim 1, wherein the kneading process comprises:
   step 4 of charging the blending agent(s) other than the vulcanization-related blending agent into the kneading chamber, in which the rubber wet master batch is present,
   step 5 of setting a second control time and a second target temperature in the control unit, and
   step 6 of stirring the rubber wet master batch and the blending agent(s) inside the kneading chamber while making a PID control for adjusting a second actually measured temperature in the kneading chamber to the second target temperature through the control unit on the basis of information on the second actually measured temperature and the second target temperature, thereby automatically controlling the rotation speed, until the second control time elapses after the completion of the steps 4 and 5,
   wherein the second actually measured temperature in the kneading chamber is an internal temperature of the kneading chamber detected by the temperature sensor and sent to the control unit during the kneading process.

\* \* \* \* \*